United States Patent [19]
Kitano et al.

[11] Patent Number: 5,861,214
[45] Date of Patent: Jan. 19, 1999

[54] THERMOEXPANDABLE MICROCAPSULE AND PRODUCTION

[75] Inventors: Kenichi Kitano, Osaka; Yoshitugu Sasaki, Amagasaki; Sueo Kida, Kashihara, all of Japan

[73] Assignee: Matsumoto Yushi-Seiyaku Co., Ltd, Osaka-fu, Japan

[21] Appl. No.: 473,978

[22] Filed: Jun. 7, 1995

Related U.S. Application Data

[63] Continuation of Ser. No. 386,339, Feb. 10, 1995, abandoned, which is a continuation of Ser. No. 64,984, May 24, 1993, abandoned.

[30] Foreign Application Priority Data

May 28, 1992 [JP] Japan .................................... 4-136885

[51] Int. Cl.$^6$ ....................................................... B32B 5/16
[52] U.S. Cl. ........................... 428/402; 264/45.5; 264/51; 264/55; 428/402.2; 428/402.21; 428/402.22; 521/51; 521/56; 521/60; 521/65; 521/72; 521/142
[58] Field of Search .................................. 521/51, 56, 60, 521/65, 72, 142; 264/45.5, 51, 55; 428/402, 402.2, 402.21, 402.22

[56] References Cited

U.S. PATENT DOCUMENTS

| | | | |
|---|---|---|---|
| 3,398,105 | 8/1968 | Roper et al. | 521/58 |
| 3,615,972 | 10/1971 | MarcLouse, Jr. et al. | |

FOREIGN PATENT DOCUMENTS

| | | |
|---|---|---|
| 1 997 581 | 6/1968 | Germany . |
| 1 719 318 | 6/1971 | Germany . |
| 1719318 | 6/1971 | Germany . |
| 42-26524 | 12/1942 | Japan . |
| 42-26524 | 12/1967 | Japan . |
| 62-286534 | 12/1987 | Japan . |

OTHER PUBLICATIONS

Patent Abstracts of Japan, vol. 12, No. 181 (C–499) May 27, 1988; and JP–A–62 286 534 published on Dec. 12, 1987.
Patent Abstracts of Japan, vol. 5, No. 147 (M–088) Sep. 17, 1981; and JP–A–56 077 192 published on Jun. 25, 1981.
Patent Abstracts, vol. 012, No. 181, (C–499) May 27, 1988, "Manufacture of Thermal Expansion Microcapsule".
Patent Abstracts of Japan, vol. 005, No. 147, (M–088) Sep. 17, 1981, "Visible Forming Sheet".

*Primary Examiner*—John M. Cooney, Jr.
*Attorney, Agent, or Firm*—Foley & Lardner

[57] ABSTRACT

The object of the present invention is to provide a thermoexpandable microcapsule which can be expanded at a lower temperature without decrease of various properties such as chemical resistance and heat resistance; said thermoexpandable microcapsule contains at least two kinds of volatile expanding agents having different boiling points lower than softening temperature of a polymeric material forming a shell, production thereof; and a method of expanding the microcapsule in which it is subjected to first heating below the starting temperature of expanding and then to the second heating.

10 Claims, No Drawings

THERMOEXPANDABLE MICROCAPSULE AND PRODUCTION

This application is a continuation of application Ser. No. 08/386,339, filed Feb. 10, 1995 which is now abandoned, which is a continuation of Ser. No. 08/064,984, filed May 24, 1993 which is now abandoned.

BACKGROUND OF THE INVENTION

The present invention relates to a thermoexpandable microcapsule, production thereof and a method of expansion.

It was described in Japanese Patent Publication No. 42-26524 a process of production of a thermoexpandable microcapsule by microencapsulating with a thermoplastic polymer a volatile expanding agent which can be vaporized at a lower temperature than the softening temperature of the thermoplastic polymer.

There are many cases that a thermoexpandable microcapsule having a heat resistance and a chemical resistance is required in use thereof. As such microcapsules a thermoexpandable microcapsule excellent in heat resistance and chemical resistance and a microcapsule excellent in heat resistance have been disclosed in Japanese Patent KOKAI No. 62-286534 and Japanese Patent Application No. 4-95174 respectively.

In order to obtain a thermoexpandable microcapsule having a high heat resistance and chemical resistance the temperature for expanding of the microcapsule must be heightened. However, when such a microcapsule is expanded, it is often heated to expand after mixed with a binder resin and the like or coated depended on the purpose of use, and it is not preferable that such a mixture is excessively heated at expanding.

SUMMARY OF THE INVENTION

The object of the present invention is to provide a a thermoexpandable microcapsule which can be expanded at a comparatively low temperature without deterioration of the heat resistance and the chemical resistance, and the expansion of said thermoexpandable microcapsule.

In order to solve the above problem at least two kinds of volatile expanding agents having different boiling points and lower than softening temperature of a polymeric material forming a shell are used as expanding agents in a thermoexpandable microcapsule.

DETAILED DESCRIPTION OF THE INVENTION

The present invention provides a thermoexpandable microcapsule which comprises at least two kinds of volatile expanding agents having different boiling points and lower than softening temperature of a polymeric material forming a shell, a method of production thereof and a method of expansion of the microcapsule.

One of the volatile expanding agents is similar to a conventional one which is used in a known thermoexpandable microcapsule, and another is one having a boiling point slightly higher than the former.

Any volatile expanding agent used in the present invention can be vaporized at a temperature lower than the softening temperature of a polymeric material forming a shell, which may have a boiling point of from −15° C. to 150° C. One of the volatile expanding agent preferably has a boiling point of from −15° C. to 70° C., and the other one has a boiling point of from 30° C. to 150° C., and the difference in the both boiling points of the expanding agents is preferably greater than 30° C., particularly 30° C. to 50° C. It is preferable to use two kinds of expanding agent, especially different in the boiling point in a ratio of a expanding agent having a lower boiling point (L) to a expanding agent having a higher boiling point (H) of 20/80 to 90/10 (by weight), more preferably 60/40 to 80/20.

The boiling point of the volatile expandable agent (L) used in the present invention is preferably lower than the softening point of the polymer forming shell by 50°–150 ° C., more preferably 80°–130° C., whereas the boiling point of the agent (H) is preferably lower than that softening point by 30°–120° C., more preferably 40°–100° C.

The mechanism of this phenomena is not clear, but it is considered that the expanding agent having a lower boiling point is permeated into a shell to plasticize the shell at the first heating, and it allows the thermoexpandable microcapsule to expand at a comparatively lower temperature by the second heating.

As a volatile expanding agent there are exemplified isobutane, normal butane, normal pentane, isopentane, hexane, cyclohexane, heptane, petroleum ethers, neopentane, propane, propylene, butene, halogenized methane (methyl chloride, methylene chloride and the like), tetralkylsilane and the like. Volatile hydrocarbons are preferable as the expanding agent. Most preferable expanding agents are isobutane, normal butane, normal pentane, isopentane, hexane, cyclohexane, heptane, petroleum ether and the like.

A polymerizable monomer used in the present invention is not restrictive. The monomer may be optionally selected from one or more polymerizable monomers which are used for a general thermoexpandable microcapsule and are polymerized to give a thermoplastic resin according to the use and object of the microcapsule. For example, when a thermoexpandable microcapsule having a high heat resistance is desired, acrylonitrile, methacrylonitrile, acrylamide, methacrylic acid or salts thereof, isobornyl methacrylate, dicyclopentenyl acrylate and the like may be preferably used as a polymerizable monomer. In order to obtain a thermoexpandable microcapsule having high chemical resistance acrylonitrile, methacrylonitrile, acrylamide, methacrylic acid or salts thereof and the like may be used.

A process for production of the microcapsule of the present invention is not restrictive, providing two or more kinds of volatile expanding agents different in the boiling point can be encapsulated. As the production an in situ polymerization is particularly preferable. In this production one or more kinds of polymerizable monomer are mixed with at least two kinds of volatile expanding agents having different boiling points and lower than the softening temperature of a polymer material forming the shell as well as a suitable polymerization initiator to make an oil phase, and the oil phase is subjected to a suspension polymerization in an aqueous phase in the presence of dispersing agents and the like if desired.

Preferable polymerization initiators include diisopropyl oxydicarbonate, lauroyl peroxide, benzoyl peroxide, azobisdimethylvaleronitrile, azobisisobutyronitrile and the like. Further, a crosslinking agent such as triethylene glycol diacrylate, ethylene glycol diacrylate, and the like; trimethylolpropane triacrylate, ethylene glycol methacrylate, divinylbenzene, triacrylformal and the like may be included.

The formulation of an aqueous solution for the suspension polymerization is not restrictive. Usually, inorganic additives such as silica, calcium phosphate, calcium carbonate, sodium chloride, sodium sulfate and the like; and organic additives such as diethanolamine/adipic acid condensation product, gelatin, methyl cellulose, polyvinyl alcohol, polyethylene oxide, dioctyl sulfosuccinate, sorbitan ester and the like are added into deionized water, and the pH value of the aqueous solution is adjusted to about 3–4 using acid.

The polymerization is carried out under usual condition, i.e. under 4–5 kg/cm$^2$, and at 50°–70° C. for 15–30 hours.

The microcapsule of the present invention may be expanded according to a very specific process. That is, the microcapsule of the present invention is first heated at a temperature lower than the initiation temperature of expanding of the microcapsule, naturally cooled and then second heated at a temperature sufficient to expand the microcapsule.

The first heating is carried out at 80°–140° C., which is depended on the polymer or kinds of volatile expanding agent. The temperature of the first heating must be lower than the initiation temperature of expanding. If the temperature of the first heating is higher than the initiation temperature of expanding by 10° to 20° C., the microcapsule will become expanded, so that the expanding ratio will be decreased by the second heating. Alternatively, if the temperature of the first heating is lower than the initiation temperature of expanding by 10° to 20° C. or more, the plasticizing effect of the shell due to the encapsulated expanding agent is insufficiently achieved.

The first heating is carried out for 1 or 2 minutes, but usually it is sufficiently achieved for 1 minute. After the first heating the microcapsule is once naturally cooled to room temperature, and then subjected to the second heating. The second heating must be carried out at a temperature higher than the initiation temperature of expanding of the microcapsule. This temperature is also depended on the kinds of the polymer or the volatile expanding agent, but usually about 90° to 200° C., preferably 100° to 180° C. This second heating is carried our for 0.5 to 2 minutes, preferably for about 2 minutes.

Comparing the heating temperatures necessary for expanding a thermoexpandable microcapsule which has been subjected to the first heating and a conventional thermoexpandable microcapsule encapsulating only one kind of a volatile expanding agent and having a shell made of the same polymer as the above without the first heating, a desirable expanding ratio can be obtained in the microcapsule which has been subjected to the first heating at a temperature lower than the latter by 10° to 30° C. When a conventional thermoexpandable microcapsule containing only one expanding agent is firstly heated, the expanding ratio obtained by the second heating is extremely decreased.

The particle size of the thermoexpandable microcapsule of the present invention is usually about 10 to 25 $\mu$m, preferably about 12 to 20 $\mu$m. By expanding according to the above process an expanded microcapsule (referred to as microballoon hereinafter) having a particle size of about 40 to 200 $\mu$m, especially 50 to 100 $\mu$m, can be obtained.

A thermoexpandable microcapsule of the present invention may be expanded as it is; after a mixture of the microcapsule with a binder and the like is coated; or after it is mixed with an adhesive agent and applied to a desirable portion.

A product which is obtained by the first heating of the thermoexpandable microcapsule of the present invention is still effective to be expanded at lower temperature after one month from the first heating.

A stable microballoon having a high expanding ratio can be obtained by expanding a thermoexpandable microcapsule of the present invention in double expanding process even at comparatively low temperature.

The present invention is illustrated in detail by Examples. In the Example "part" and "percent" are shown "by weight" unless otherwise specifically referred.

EXAMPLE

Preparation of Microcapsule

An aqueous medium was prepared according to the following formulation, and the pH value of the medium was adjust to 3 by sulfuric acid.

| Formulation | |
| --- | --- |
| ingredients | parts by weight |
| ion exchanging water | 600 |
| dispersion of colloidal silica (solid 20%) | 100 |
| diethanolamine/adipic acid condensation product (50% aq. sol.) | 5 |

Several kinds of oil phases were prepared according to each formulation shown in the Examples and Comparative Examples hereinafter. The each oil phase was added into the above aqueous medium and dispersed by a homomixer (made by Tokushukika K.K.) at 6,000 rpm for 120 seconds. The obtained dispersion was reacted under a pressure of 4–5 kg/cm$^2$, at 60° C. for 20 hours in an autoclave substituted with nitrogen gas to give thermoexpandable microcapsules. The obtained microcapsules were subjected to the first and second heating, and the expanding ratio of each expanded product was determined.

Preparation of Test Sample

Each thermoexpandable microcapsule obtained was mixed with an ethylene/vinyl acetate type binder in the ratio of microcapsule (solid)/binder (solid) being 1/2. This mixture was coated on high grade paper such that the thickness of the coated layer after dried is about 100–150 $\mu$m, and then dried by air. The thickness of the dried coated layer was determined. The coated paper was heated at given temperatures in an oven.

Heat Treatment

First Heating: The test sample after air-dried was heated at a given temperature for one minute, and it was naturally cooled to a room temperature Second Heating: One coated paper was subjected to the second heating at a given temperature for 2 minutes after the first heating, and other coated paper was heated under the same condition without the first heating.

The thickness of the coated layer after the second heating was determined to calculate the expanding ratio by following equation:

$$\text{expanding ratio} = \frac{\text{thickness after second heating}}{\text{thickness after air-dried}}$$

The expanding ratio was determined in each Examples and Comparative Examples.

Formulation of Oil Phase of Examples and Comparative Examples

Comparative Example 1

Following ingredients were mixed and polymerized according to the above process to give a thermoexpandable microcapsule having an average diameter of 15.5 μm.

| ingredients | parts by weight |
|---|---|
| acrylonitrile | 150 |
| methyl methacrylate | 60 |
| methyl acrylate | 40 |
| isobutane | 70 |
| diisopropyl oxydicarbonate | 5 |

Example 1

Following ingredients were mixed and polymerized according to the above process to give a thermoexpandable microcapsule having an average diameter of 16.1 μm.

| ingredients | parts by weight |
|---|---|
| acrylonitrile | 150 |
| methyl methacrylate | 60 |
| methyl acrylate | 40 |
| isobutane | 45 |
| normal pentane | 25 |
| diisopropyl oxydicarbonate | 5 |

Comparative Example 2

Following ingredients were mixed and polymerized according to the above process to give a thermoexpandable microcapsule having an average diameter of 12.1 μm.

| ingredients | parts by weight |
|---|---|
| acrylonitrile | 60 |
| vinylidene chloride | 150 |
| methyl methacrylate | 40 |
| isobutane | 70 |
| diisopropyl oxydicarbonate | 5 |

Example 2

Following ingredients were mixed and polymerized according to the above process to give a thermoexpandable microcapsule having an average diameter of 11.7 μm.

| ingredients | parts by weight |
|---|---|
| acrylonitrile | 60 |
| vinylidene chloride | 150 |
| methyl methacrylate | 40 |
| isobutane | 55 |
| normal pentane | 15 |
| diisopropyl oxydicarbonate | 5 |

Comparative Example 3

Following ingredients were mixed and polymerized according to the above process to give a thermoexpandable microcapsule having an average diameter of 13.3 μm.

| ingredients | parts by weight |
|---|---|
| acrylonitrile | 170 |
| methyl methacrylate | 130 |
| isobutane | 100 |
| diisopropyl oxydicarbonate | 5 |

Example 3

Following ingredients were mixed and polymerized according to the above process to give a thermoexpandable microcapsule having an average diameter of 12.7 μm.

| ingredients | parts by weight |
|---|---|
| acrylonitrile | 170 |
| methyl methacrylate | 130 |
| isobutane | 70 |
| petroleum ethers | 30 |
| diisopropyl oxydicarbonate | 5 |

Comparative Example 4

Following ingredients were mixed and polymerized according to the above process to give a thermoexpandable microcapsule having an average diameter of 20.5 μm.

| ingredients | parts by weight |
|---|---|
| acrylonitrile | 200 |
| methacrylonitrile | 100 |
| methyl methacrylate | 20 |
| normal pentane | 80 |
| azobisdimethyl valeronitrile | 5 |

Example 4

Following ingredients were mixed and polymerized according to the above process to give a thermoexpandable microcapsule having an average diameter of 20.9 μm.

| ingredients | parts by weight |
|---|---|
| acrylonitrile | 200 |
| methacrylonitrile | 100 |
| methyl methacrylate | 20 |
| normal pentane | 60 |
| normal hexane | 20 |
| azobisdimethyl valeronitrile | 5 |

The expanding ratio of the above microcapsule (expanding ratio of microcapsule according to difference between expanding methods) was determined, and the results were shown in Table 1.

TABLE 1

| Ex./C. Ex. | average particle size μm | first heating temp. °C × 1 min. | expanding ratio after second heating (°C × 2 minutes) | | | | | | | | | | |
|---|---|---|---|---|---|---|---|---|---|---|---|---|---|
| | | | 80 | 90 | 100 | 110 | 120 | 130 | 140 | 150 | 160 | 170 | 180 |
| C. Ex. 1 | 15.5 | — | | 1.3 | 3.5 | 5.2 | 8.6 | 12.2 | | | | | |
| | | 90 | | 1.2 | 1.8 | 3.0 | 3.5 | 4.5 | | | | | |
| Ex. 1 | 16.1 | — | | 1.2 | 3.7 | 6.1 | 8.5 | 13.5 | | | | | |
| | | 90 | | 5.3 | 8.1 | 10.5 | 12.2 | 12.5 | | | | | |
| C. Ex. 2 | 12.1 | — | 1.1 | 5.2 | 6.0 | | 8.5 | 10.5 | | | | | |
| | | 80 | 1.1 | 2.0 | 2.2 | 2.5 | 3.0 | | | | | | |
| Ex. 2 | 11.7 | — | 1.1 | 4.9 | 6.1 | 8.3 | 11.1 | | | | | | |
| | | 80 | 5.5 | 8.1 | 8.9 | 10.1 | 10.9 | | | | | | |
| C. Ex. 3 | 13.3 | — | | | 1.4 | 1.5 | 2.8 | 4.6 | 6.8 | | | | |
| | | 100 | | | 1.2 | 1.3 | 2.0 | 2.3 | 3.1 | | | | |
| Ex. 3 | 12.7 | — | | | 1.5 | 1.8 | 3.1 | 5.2 | 7.4 | | | | |
| | | 100 | | | 4.6 | 5.5 | 6.2 | 6.8 | 6.8 | | | | |
| C. Ex. 4 | 20.5 | — | | | | | | | 1.4 | 6.5 | 11.5 | 13.1 | 10.5 |
| | | 140 | | | | | | | 1.3 | 2.8 | 6.9 | 6.5 | 3.5 |
| Ex. 4 | 20.9 | — | | | | | | | 1.2 | 5.4 | 12.1 | 13.9 | 13.2 |
| | | 140 | | | | | | | 5.6 | 8.2 | 11.3 | 13.5 | 12.4 |

What is claimed is:

1. A process for production of a thermoexpandable microcapsule comprising a shell of thermoplastic resin and at least two kinds of volatile expanding agents having different boiling points lower than softening temperature of the thermoplastic resin forming the shell; said thermoplastic resin is prepared from polymerizable monomers selected from the group consisting of acrylonitrile, methacrylonitrile, acrylamide, methacrylic acid, acrylate, methacrylate, vinylidene chloride and salts of said monomers; said process comprises suspension polymerizing said one or more polymerizable monomers in water in the presence of said at least two kinds of volatile expanding agents having different boiling points lower than softening temperature of a thermoplastic resin of a shell, wherein said at least two kinds of volatile expanding agents are present in the water before polymerization begins, and whereby the monomers polymerize into a shell which encapsulates the at least two volatile expanding agents and then heating the thermoexpandable microcapsule at a temperature lower than a starting temperature of expansion by 20° C. at the most.

2. A process for production of a thermoexpandable microcapsule of claim 1, wherein the volatile expanding agents are selected from the group consisting of isobutane, normal butane, normal pentane, isopentane, hexane, cyclohexane, heptane, and a petroleum ether.

3. A process for production of a thermoexpandable microcapsule according to claim 1, wherein one of said at least two kinds of volatile expanding agents has a boiling point 80°–130° C. lower than the softening temperature of the polymeric material forming the shell while the other volatile agent has a boiling point 40°–100° C. lower than the softening temperature of the polymeric shell material.

4. A process for production of a thermoexpandable microcapsule according to claim 1, wherein one of said at least two kinds of volatile expanding agents has a boiling point from −15° C. to 70° C., and the other one of said at least two kinds of volatile expanding agents has a boiling point of from 30° C. to 150° C.

5. A process for production of a thermoexpandable microcapsule according to claim 4, wherein the difference in the boiling points between the at least two kinds of volatile expanding agents is 30° C. to 50° C.

6. A process for expanding a thermoexpandable microcapsule which comprises a shell of a thermoplastic resin and at least two kinds of volatile expanding agents having different boiling points lower than a softening temperature of the thermoplastic resin forming the shell of the microcapsule; said thermoplastic resin is prepared from polymerizable monomers which are selected from the group consisting of acrylonitrile, methacrylonitrile, acrylamide, and methacrylic acid, acrylate methacrylate, vinylidene chloride and salts of said monomers; and process comprises heating the thermoexpandable microcapsule at a temperature lower than a starting temperature of expansion by 20° C. at the most, and then heating it to expand the thermoexpandable microcapsule.

7. A process for expanding a thermoexpandable microcapsule of claim 6, wherein the volatile expanding agents are selected from the group consisting of isobutane, normal butane, normal pentane, isopentane, hexane, cyclohexane, heptane and a petroleum ether.

8. A process for expanding a thermoexpandable microcapsule according to claim 6, wherein one of said at least two kinds of volatile expanding agents has a boiling point 80°–130° C. lower than the softening temperature of the polymeric material forming the shell while the other volatile agent has a boiling point 40°–100° C. lower than the softening temperature of the polymeric shell material.

9. A process for expanding a thermoexpandable microcapsule according to claim 6, wherein one of the at least two kinds of volatile expanding agents has a boiling point from −15° C. to 70° C., and the other one has a boiling point of from 30° C. to 150° C.

10. A process for expanding a thermoexpandable microcapsule according to claim 9, wherein the difference in the boiling points of the expandable agent is 30° C. to 50° C.

* * * * *